L. L. & W. E. JOHNSON.
Automatic Wagon-Brake.
No. 216,856. Patented June 24, 1879.
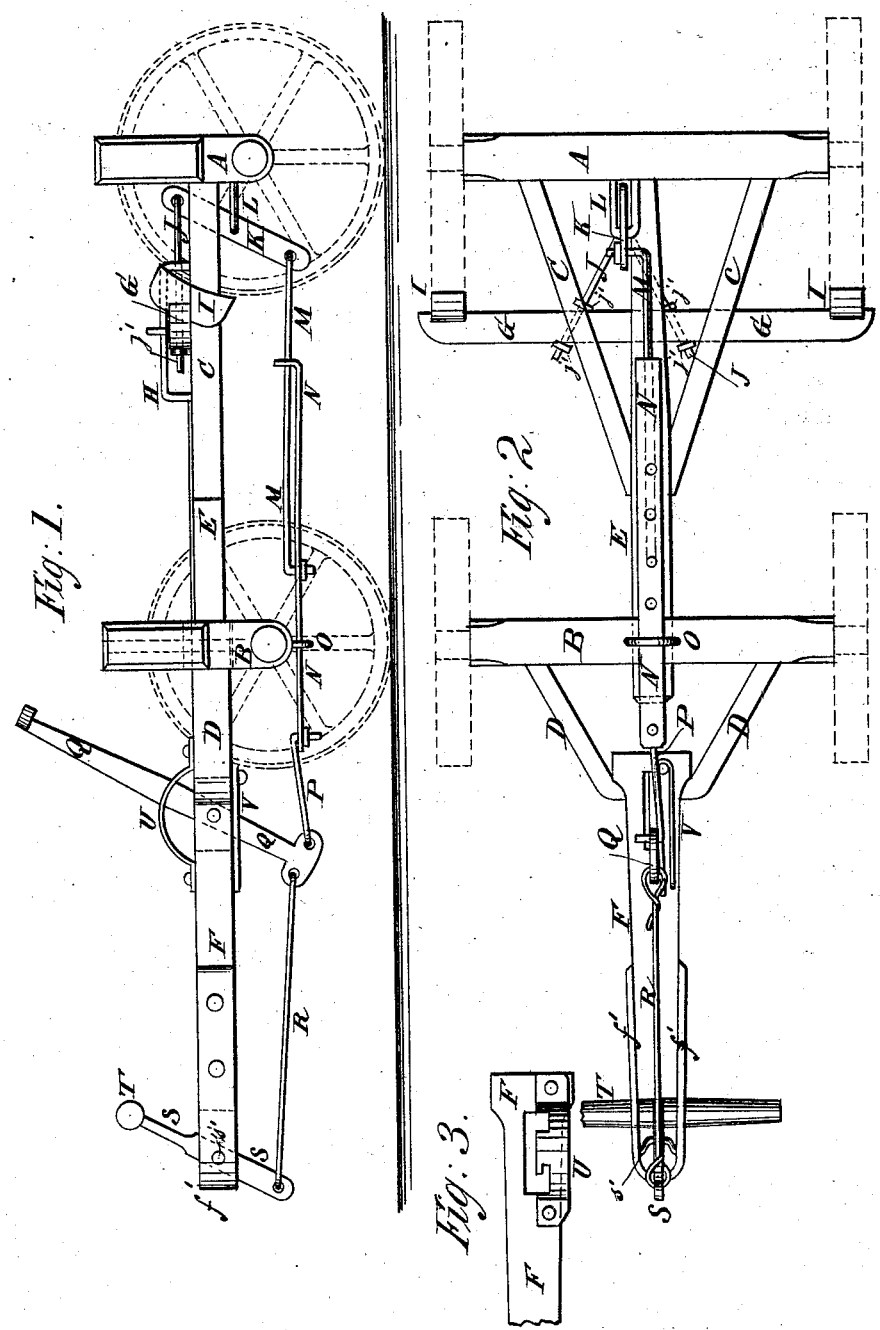
WITNESSES:
Achilles Schehl.
C. Sedgwick
INVENTOR:
L. L. Johnson
W. E. Johnson
BY Munn & Co
ATTORNEYS.

UNITED STATES PATENT OFFICE.

LYCOURGUS L. JOHNSON AND WILLIAM E. JOHNSON, OF ALANTHUS GROVE, ASSIGNORS TO THEMSELVES AND M. D. FEATHER, OF RICHMOND, MO.

IMPROVEMENT IN AUTOMATIC WAGON-BRAKES.

Specification forming part of Letters Patent No. 216,856, dated June 24, 1879; application filed April 8, 1879.

*To all whom it may concern:*

Be it known that we, LYCOURGUS L. JOHNSON and WILLIAM E. JOHNSON, of Alanthus Grove, in the county of Gentry and State of Missouri, have invented a new and useful Improvement in Self-Acting Wagon-Brakes, of which the following is a specification.

Figure 1 is a side view of the running-gearing of a wagon to which our improved brake has been applied. Fig. 2 is a view of the under side of the same. Fig. 3 is a detail top view of the catch for the foot-lever.

Similar letters of reference indicate corresponding parts.

The object of this invention is to furnish an improved brake for wagons and carriages, which shall be so constructed that the brake will be applied by the action of the horses in holding back, and with a force exactly proportioned to the forward pressure of the load, which will allow the brake to be locked in position when off, so that the wagon can be backed without applying the brake, and when on, so that the brake will remain applied even when the horses are detached, and which shall be simple in construction and reliable and convenient in use.

The invention consists in bending a bolt into a semicircular form, and securing it at the end to a U-strap on the front end of tongue, and in combining it with the neck-yoke lever, as hereinafter described.

A represents the rear axle, B the forward axle, C the rear hounds, D the forward hounds, E the reach, and F the tongue, of the running-gearing of a wagon. G is the brake-bar, which slides in keepers H, attached to the rear hounds, C, and to its ends are attached the brake-shoes I. To the brake-bar G is attached the forked forward end of the rod J, the rear end of which is pivoted to the end of the short upper arm of the lever K.

The forward ends of the forked rod J are passed through the brake-bar G, and have screw-threads cut upon them to receive the jam-nuts $j'$, which are screwed upon them upon the opposite sides of the said brake-bar G, so that the wear of the brake-shoes I may be taken up by adjusting the said jam-nuts $j'$.

The lever K is pivoted to a support, L, attached to the rear axle, A, and to the end of its long lower arm is pivoted the rear end of the rod M. The rod M passes through a hole in the upwardly-projecting rear end of the bar N, and has a hook formed upon its forward end to hook into a hole in the said bar N. Several holes are formed in the bar N to receive the hook of the rod M, so that the said rod and bar may be lengthened and shortened to correspond with the adjustment of the wagon-gearing. The bar N passes through a keeper, O, attached to the lower side of the forward axle, B, and to its forward end is pivoted the rear end of the rod P. The forward end of the rod P is pivoted to the lower end of the foot-lever Q, which passes through and is pivoted in a slot in the rear part of the tongue F.

The upper end of the lever Q has a foot-rest formed upon it, and projects into such a position that it may be operated by the driver with his foot. To the lower end of the foot-lever Q is pivoted the rear end of the rod R, the forward end of which is pivoted to the lower end of the lever S.

The lever S is pivoted to the forward end of the tongue F by a bolt, $s'$, which is bent into a semicircular form, and its ends are secured to a U-strap, $f'$, which is attached to the forward end of the tongue F, so that one horse may get in advance of the other without applying the brake. This same thing may be accomplished by connecting the neck-yoke T with the upper end of the lever S by a swivel-joint. With this construction the action of the horses in holding back will apply the brakes, and the brakes will be withdrawn from the wheels as soon as the horses begin to draw.

To the rear part of the tongue F, at the side of the slot through which the lever Q passes, is attached an arched bar, U, in the edge of which are formed two notches to receive the said lever Q. When the brake is applied the lever Q will be inclined to the rearward, and may be pushed into the rear notch of the arched bar U to hold the brake locked against the wheels when the horses are not holding back, and even when the horses are detached.

When the brake is off, the lever Q is inclined forward, and may be pushed into the forward notch of the arched bar U, so that the horses may back the wagon without applying the brake.

V is a spring attached to the lower side of the tongue F to bear against the lever Q and prevent it from entering either of the notches of the arched bar U. The joint between the bar N and the rod P allows the wagon to be turned without interfering with the brake, and allows the brake to be applied when the wagon is cramped as well as when it is straight.

Having thus described our invention, we claim as new and desire to secure by Letters Patent—

1. In a wagon-brake, the bolt $s'$, bent into a semicircular form and secured at the ends to a U-strap, $f'$, on the front end of tongue to allow the neck-yoke to turn with safety.

2. The curved bolt $s'$, in combination with the neck-yoke lever S, and with the U-strap $f'$, attached to the forward end of the tongue F, substantially as herein shown and described.

LYCOURGUS LEVI JOHNSON.
WILLIAM EWING JOHNSON.

Witnesses:
WM. MAIN,
E. E. RIDGELL.